United States Patent
Fathi

(10) Patent No.: US 10,974,493 B2
(45) Date of Patent: Apr. 13, 2021

(54) BONDING OF SUBSTRATES INDUCED BY IONIZING RADIATION

(71) Applicant: IMMUNOLIGHT, LLC, Detroit, MI (US)

(72) Inventor: Zakaryae Fathi, Raleigh, NC (US)

(73) Assignee: IMMUNOLIGHT, LLC, Detroit, MI (US)

( * ) Notice: Subject to any disclaimer, the term of this patent is extended or adjusted under 35 U.S.C. 154(b) by 107 days.

(21) Appl. No.: 15/896,654

(22) Filed: Feb. 14, 2018

(65) Prior Publication Data

US 2018/0170028 A1 Jun. 21, 2018

Related U.S. Application Data

(60) Continuation of application No. 15/464,913, filed on Mar. 21, 2017, now Pat. No. 9,937,695, which is a
(Continued)

(51) Int. Cl.
   *B32B 38/00* (2006.01)
   *C09J 5/00* (2006.01)
   (Continued)

(52) U.S. Cl.
   CPC ...... *B32B 38/0008* (2013.01); *B32B 37/0046* (2013.01); *B32B 37/12* (2013.01); *C09J 5/00* (2013.01); *C09J 5/04* (2013.01); *C09J 11/04* (2013.01); *C09J 133/12* (2013.01); *B32B 2037/1253* (2013.01); *B32B 2310/0881* (2013.01); *C08K 3/00* (2013.01); *C08K 3/22* (2013.01); *C08K 2003/2244* (2013.01); *C09J 157/00* (2013.01); *C09J 2301/416* (2020.08); *C09J 2433/00* (2013.01)

(58) Field of Classification Search
   CPC . B32B 38/0008; B32B 37/0046; B32B 37/12; C09J 5/00; C09J 5/04; C09J 11/04; C09J 133/12
   See application file for complete search history.

(56) References Cited

U.S. PATENT DOCUMENTS 3,708,413 A * 1/1973 Kehr .................. C08G 18/6715
                                                               522/97
5,376,503 A    12/1994 Audett et al.
(Continued)

FOREIGN PATENT DOCUMENTS

EP   1 026 218 A1   8/2000
EP   1 219 694 A1   7/2002

OTHER PUBLICATIONS

Extended European Search Report dated Jul. 14, 2017 in European Patent Application No. 16194707.2.
(Continued)

*Primary Examiner* — Daniel McNally
(74) *Attorney, Agent, or Firm* — Oblon, McClelland, Maier & Neustadt, L.L.P.

(57) ABSTRACT

A reactive polymer composition is provided, containing a (co)polymer that forms one or more reactive moities, either directly or indirectly, upon application of an ionizing radiation; and a multifunctional curing coagent, along with systems and methods for bonding substrates to one another using such a composition.

12 Claims, 7 Drawing Sheets

*The conformable film that is phosphor loaded can accommodate stretching and maintaining its shape across complex interfaces.*

Related U.S. Application Data division of application No. 14/959,198, filed on Dec. 4, 2015, now Pat. No. 9,701,102, which is a division of application No. 14/103,084, filed on Dec. 11, 2013, now abandoned.

(60) Provisional application No. 61/735,754, filed on Dec. 11, 2012.

(51) Int. Cl.
*C09J 133/12* (2006.01)
*B32B 37/00* (2006.01)
*B32B 37/12* (2006.01)
*C09J 5/04* (2006.01)
*C09J 11/04* (2006.01)
*C09J 157/00* (2006.01)
*C08K 3/00* (2018.01)
*C08K 3/22* (2006.01)

(56) References Cited

U.S. PATENT DOCUMENTS

| | | | |
|---|---|---|---|
| 5,426,130 A | 6/1995 | Thurber | |
| 5,997,682 A * | 12/1999 | Goodman | B29C 35/08 |
| | | | 156/273.7 |
| 9,701,102 B2 | 7/2017 | Fathi | |
| 2007/0138411 A1 | 6/2007 | Konarski | |
| 2008/0045619 A1 | 2/2008 | Jackson et al. | |
| 2008/0138618 A1 | 6/2008 | Sasaki et al. | |
| 2012/0089180 A1 | 4/2012 | Fathi et al. | |

OTHER PUBLICATIONS

International Search Report and Written Opinion with Search History dated Apr. 14, 2014 in PCT/US2013/074378.
Partial Supplementary European Search Report dated Jun. 9, 2016 in Patent Application No. 13863445.6.
Anonymous: "High Lights! Energy curing with Darocur, Irgacure, Laromer, and Lucirin", May 5, 2010, XP055276679, pp. 1-5.
Extended European Search Report dated Oct. 11, 2016 in Patent Application No. 13863445.6.
Partial European Search Report dated Feb. 6, 2017, in European Patent Application No. 16194707.2.
European Office Action dated Jul. 17, 2020 in Patent Application No. 13 863 445.6, 7 pages.
Anonymous: "Bomar® BR-582E8 Aliphatic Polyether Urethane Acrylate Oligomer, BR582E8 Product Data Sheet" DYMAX, Retrieved from the Internet: URL:https://dymax-oc.com/images/pdf/pds/br-582e8.pdf, 2014, 1 page.
Anonymous: "Safety Data Sheet Laromer® PO 94 F" BASF, Feb. 14, 2019, pp. 1-11.

* cited by examiner

*Phosphor without a coating and with a coating*

*A number of powders can be individually coated when ball milling is used*

*An aggregate of a mix of phosphor particles with a PMMA coating*

*An aggregate of a mix of phosphor particles with a
PMMA coating containing a peroxide chemistry*

*A draw knife seated at a specific height from a glass plate to yield a desirable film thickness after the draw of the slurry*

*Top view of the phosphor-loaded film*

*The phosphor loaded film can be die cut into various shapes*

*The conformable film that is phosphor loaded can accommodate stretching and maintaining its shape across complex interfaces.*

BONDING OF SUBSTRATES INDUCED BY IONIZING RADIATION

CROSS REFERENCE TO RELATED APPLICATIONS

The present application is a Continuation of U.S. application Ser. No. 15/464,913, filed Mar. 21, 2017, now allowed, which is a Divisional of U.S. application Ser. No. 14/959,198, filed Dec. 4, 2015, now U.S. Pat. No. 9,701,102, which is a Divisional of U.S. application Ser. No. 14/103,084, filed Dec. 11, 2013, abandoned, which claims priority to U.S. provisional application No. 61/735,754, filed Dec. 11, 2012, the entire contents of each of which are incorporated herein by reference.

BACKGROUND OF THE INVENTION

Field of the Invention

The present invention relates to the activation of suitably reactive chemistries across an interface after initiating a chemical reaction using a deeply penetrating form of ionizing energy including x-rays, gamma radiation, and e-beam. The present invention covers methods of use, to enable generation of a reactive species, such as radicals, cations, anions, etc, and subsequently bond formation across an interface, particularly polymers bonding, and more particularly to methods for using direct bond scission and reactive species generation of reactive chemistries under X-Ray, e-beam and UV radiation and thermal energy in applications where two objects become bonded across their interface in the absence of direct line of sight.

Discussion of the Background

Adhesives are well known and are used for a wide variety of applications. One particularly important application domain is in the field of manufacturing and assembly, where thermoset adhesives are used to bond one material to another material. Commercially available materials are formulated to meet various requirements, and in addition to the monomer(s) may contain particulate fillers such as metal, oxides, or dielectric powders, as well as various additives to control thermal conductivity, viscosity and other properties. The adhesive materials are typically dispensed as a thixotropic fluid in precise locations, and after all the parts are placed, the entire assembly is heated to a temperature necessary to polymerize the monomers or crosslink resins. The adhesion of two objects is done by adding the adhesive material at the interface of two objects to be bonded. The potential elimination of the addition of a third layer (the adhesive in this case) would be of great benefits. The tool used to dispense an adhesive is eliminated and the step required to cure the adhesive under heat is also rendered obsolete which saves overall cycle time.

As modern assembly methods evolve and more process steps are streamlined for a more efficient and more vertically integrated process, the steps needed to maximize assembly tool utilization, the permissible thermal budget and process cycle time during assembly continue to decrease. Faster manufacturing and higher yields are always of great benefit to the manufacturers.

The clear limitation of conventional photoinitiators is the need to have direct line-of-sight access to a suitable light source. The clear limitation of conventional thermally activated adhesive is the inherent poor thermal conductivity of the materials to be bonded which results in a long process time. The direct welding of two interfaces would be highly desirable. A further disadvantage of thermal activation of adhesives is the potential thermal expansion mis-match when bonding unlike materials to one another.

Furthermore, the assemblies used for various commercial products are relatively small. While electron beam can deliver a desirable source of radiation, the electron beam is not compact and is more applicable to large form factors (such is the case of a wide web process for example). X-Ray energy is delivered through a more compact set of equipment and can be integrated in various tools for more efficient tool utilization.

SUMMARY OF THE INVENTION

Accordingly, one object of the present invention is to provide novel material chemistry which has the ability to form a reactive moiety, such as free radicals or ions, under X-Ray energy, alone or in combination with UV radiation and/or heat for further enhancement of reactive moiety formation.

Another object of the present invention is to provide reactive chemistries and associated methods of use to bond two substrates across their interface under X-Ray, e-beam and UV radiation, wherein the reactive chemistries react by way of a mechanism including, but not limited to, chain scission, photo-initiation, and a combination of chain scission and photo-initiation in the absence of line-of-sight.

A further object of the present invention is to provide methods for bonding two or more substrates together wherein the bond formation at the interface between two substrates is achieved without the requirement of thermal heating; although, thermal heating can be used in some cases to assist in the achievement of better bonding properties, as desired.

A further object of the present invention is to provide an adhesive composition that may be cured at ambient temperature.

Another object of the present invention is to provide a film composition containing a polymer that undergoes a reaction to form a reactive moiety thereon, such as chain scission, under X-Ray or e-beam radiation, and that contains one or more down-converting energy converters, such as a phosphor or scintillator material.

These and other objects of the present invention, either individually or in combinations of two or more, have been satisfied by the discovery of a reactive polymer composition comprising:

a (co)polymer that forms one or more reactive moieties either directly or indirectly, upon application of an ionizing radiation; and a multifunctional curing coagent;

and its use in systems and methods for bonding substrates to one another.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:3

DETAILED DESCRIPTION OF THE PREFERRED EMBODIMENTS

Figure 1:
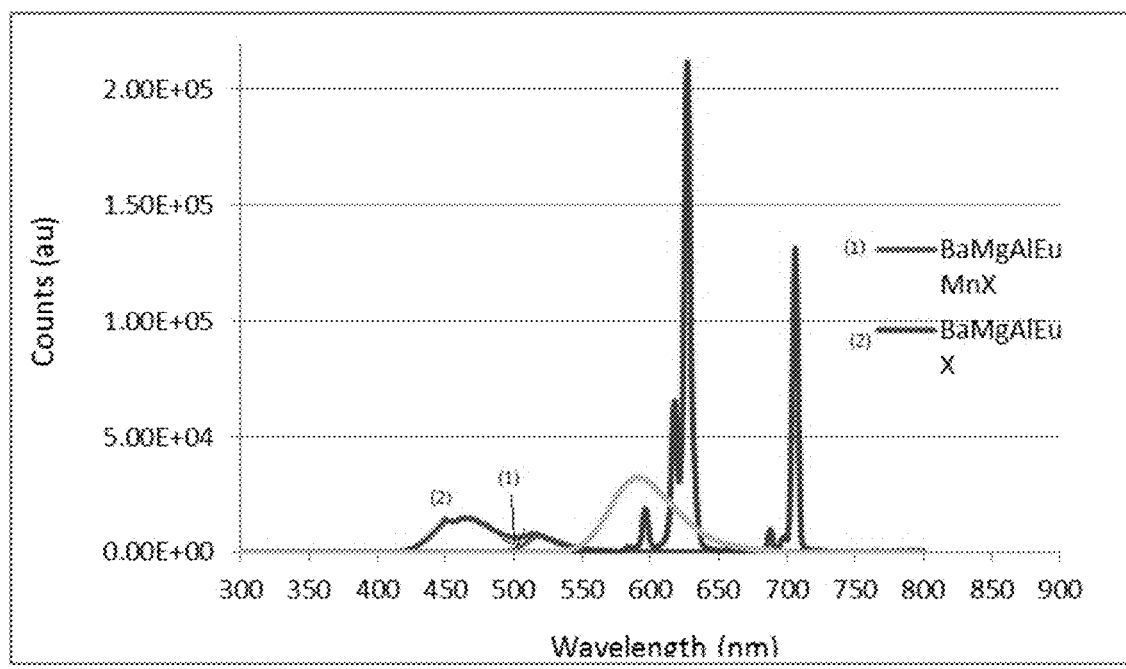
FIG. 1 provides an emission spectrum under X-Ray for several phosphors.

The present invention relates to novel material chemistries which have the ability to form one or more reactive moieties, including but not limited to free radicals, cations, anions, carbenes, nitrenes, etc., under X-Ray or e-beam energy, alone or in combination with UV radiation and/or heat for further enhancement of reactive moiety formation, which upon the formation of such reactive moieties, can be used to effect bonding of two adjacent substrates.

In its simplest form, the present invention provides a reactive polymer composition comprising:

a (co)polymer that forms one or more reactive moieties, either directly or indirectly, upon application of an ionizing radiation; and a multifunctional curing coagent.

The present invention further provides a system for bonding, comprising:

a first substrate having at least one surface containing a first reactive polymer composition;

a second substrate, optionally having at least one surface containing a second reactive polymer composition;

wherein the first reactive polymer composition and the second reactive polymer composition may be the same or different, and each comprises a (co)polymer that forms one or more reactive moieties, either directly or indirectly, upon application of an ionizing radiation and a multifunctional curing coagent; and a source of ionizing radiation.

The present invention additionally provides a method for bonding, comprising:

providing a first substrate and a second substrate to be bonded together, wherein the first and second substrates may be the same or different;

providing a first reactive polymer composition comprising a (co)polymer that forms one or more reactive moieties, either directly or indirectly, upon application of an ionizing radiation and a multifunctional curing coagent, wherein the first reactive polymer composition is in contact with at least one of the first and second substrates;

placing the first and second substrates in close proximity to one another; and applying the ionizing radiation, thus forming the one or more reactive moieties in the first reactive polymer composition which react to form a bond between the first and second substrates.

In a further embodiment, the present invention provides a method for bonding, comprising:

providing a first substrate and a second substrate to be bonded together, wherein the first and second substrates may be the same or different;

providing a first reactive polymer composition comprising a (co)polymer that forms one or more reactive moieties, either directly or indirectly, upon application of an ionizing radiation and a multifunctional curing coagent, wherein the first reactive polymer composition is in the form of a conformable film or coating;

placing the first and second substrates in close proximity to one another and having the first reactive polymer composition therebetween; and applying the ionizing radiation, thus forming the one or more reactive moieties in the first reactive polymer composition which react to form a bond between the first and second substrates.

The present invention reactive chemistries located across an interface between two substrates preferably are complimentary and reactive to one another. In one preferred embodiment, the reactive chemistries of the present invention can form the surface of one or both substrates, which upon activation using the high energy radiation, undergo reaction to form the one or more reactive moieties, preferably free radicals, which result in bonding one layer to the other across the interface. In an alternate embodiment, a compatibilizing intermediary layer can be used which reacts with each substrate surface independently, while using the intermediary layer to effect the bond between the layers. In a further embodiment, the substrate surfaces are coated with the reactive chemistry, which results in reactive moiety formation, and the creation of chemical bonds between components of the coating on the surface, and between the coatings on each surface. In the present invention, the application of X-ray radiation to the novel chemistry causes the formation and/or release of a catalyst at the bonding interface.

The present invention relates to reactive chemistries and associated methods of use to bond two substrates across their interface under X-Ray, e-beam and UV radiation, wherein the reactive chemistries react by way of a mechanism including, but not limited to, radical formation (which can be by hydrogen or other atom or group abstraction, chain scission, or any other mechanism forming radicals), cation or anion formation, photo-initiation, and a combination of two or more of the above in the absence of line-of-sight.

The present invention methods are used for bonding two or more substrates together wherein the bond formation at the interface between two substrates is achieved without the requirement of UV activation or thermal heating. However, in an alternate embodiment, either or both of UV activation and thermal heating can be used in some cases to assist in the achievement of better bonding properties, as desired.

Within the context of the present invention, the term "substrate" or "substrates" is used merely to refer to an object being acted upon in the present invention method, such that the bonding of two substrates causes at least one surface of a first substrate to bond to at least one surface of a second substrate. While the method is described with respect to bonding two substrates to one another, it is possible to use the present invention method to simultaneously, or sequentially, bond multiple substrates to one another, depending on the final structure desired.

In this invention, substrates are caused to form a bond either directly or indirectly under the application of X-Ray energy, e-beam or a combination of UV and X-Ray and e-beam energy. In the present invention, these sources of energy can operate interchangeably, depending on the chemistry used.

In the case of the direct bond formation between two substrates, the chemistries of the two substrates is modified and made to include the novel reactive chemistries at their interfaces. The novel reactive chemistries can be disposed at the interface of the two substrates by virtue of being interwoven (or blended) in the composition of the objects or can be applied as a surface modification or coating on the surface of the substrate to be bonded. In the case where one substrate is made of a polymer material, the reactive chemistry may be blended in as a co-polymer. The substrates can be made of any material, including, but not limited to, polymers and plastics, glass, ceramics, metals, metal oxides, etc.

In the case of indirect bond formation between two substrates, a layer of the present invention chemistry is applied either to one or both substrate surfaces to be bonded, or as a separate layer in the interface formed between the two substrate surfaces to be bonded, followed by pressing the objects together and exposing the thus formed assembly to X-Ray energy. The layer of the present invention chemistry is preferably applied as a conformable coating or as a conformable film.

The present invention reactive chemistries get activated by X-Ray energy and or the combination of X-Ray and UV radiation. In embodiments that use UV radiation, when line-of-sight is not possible, or when the substrate material is not UV transmissive, the UV radiation at the interface of the two substrates in the present invention is generated through the down conversion of X-Ray energy into UV energy enabled by energy modulating agents, preferably in particle form. Suitable energy modulation agents and particles are disclosed in U.S. application Ser. No. 12/764,184, filed Apr. 21, 2010; U.S. application Ser. No. 12/763,404, filed Apr. 20, 2010; U.S. application Ser. No. 12/843,188, filed Jul. 26, 2010; U.S. application Ser. No. 12/891,466, filed Sep. 27, 2010; U.S. application Ser. No. 12/943,787, filed Nov. 10, 2010; U.S. application Ser. No. 13/054,279, filed Jul. 13, 2011; U.S. application Ser. No. 13/102,277, filed May 6, 2011; U.S. application Ser. No. 13/204,355, filed Aug. 5, 2011; U.S. application Ser. No. 12/725,108, filed Mar. 16, 2010; U.S. application Ser. No. 12/059,484, filed Mar. 31, 2008; U.S. application Ser. No. 11/935,655, filed Nov. 6, 2007; U.S. application Ser. No. 12/401,478 filed Mar. 10, 2009; U.S. application Ser. No. 11/935,655, filed Nov. 6, 2007; and Ser. No. 12/059,484, filed Mar. 31, 2008; U.S. application Ser. No. 12/389,946, filed Feb. 20, 2009; and U.S. application Ser. No. 12/417,779, filed Apr. 3, 2009, the entire disclosures of each of which are hereby incorporated by reference.

In a preferred embodiment of the present invention, the generation of the reactive moiety, and formation of the bonds between substrates is performed at ambient temperature. This is particularly important in the case where the two substrates to be bonded are made of materials having differing coefficients of thermal expansion.

Another object of the present invention is to provide a film composition containing a polymer that undergoes reactive moiety formation under exposure to ionizing radiation, and that contains a down-converting energy modulation agent, preferably a phosphor or scintillator material.

The reactive moieties of the present invention can be any reactive moiety that can be formed by reaction of the reactive composition with ionizing radiation, either by direct interaction with the ionizing radiation, or indirectly through energy conversion by an energy modulating agent to generate UV or another energy that generates the reactive moiety. The reactive moieties include, but are not limited to, free radicals, cations, anions, carbenes, nitrenes, etc. For ease of discussion, the following discussion is drawn to generation of free radicals. However, one of ordinary skill would understand that the same procedures can be used to generate the other forms of reactive moieties, which can then interact with compositions to form bonds, thus resulting in bonding of two substrates.

Organic Peroxides:

Peroxides and more suitably organic peroxides are widely used commercially to initiate and create free-radical polymerization. Some peroxides are initiated by ionizing radiation and others are thermally activated. Examples of suitable peroxides of interest in the present invention include, but are not limited to:

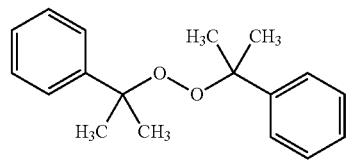

Dicumyl peroxide

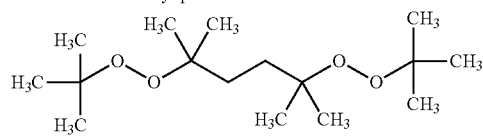

2,5-Bis(tert-butylperoxy)-2,5-dimethylhexane, (preferably blended with calcium carbonate and silica)

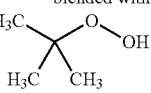

tert-Butyl hydroperoxide

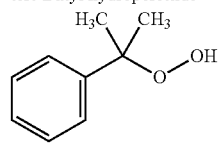

Cumene hydroperoxide

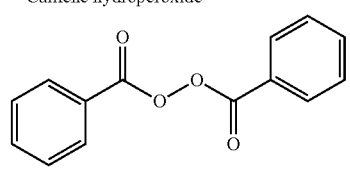

Benzoyl peroxide

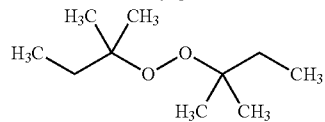

Di-tert-amyl peroxide

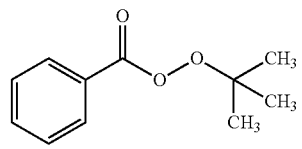

tert-Butyl peroxybenzoate

Oxygen Inhibition:

Once a free-radical initiation takes place, the polymerization of various chemistries can take place. However, in such free radical initiated reactions, oxygen inhibition can take place, resulting in incomplete polymerization, and incomplete reaction between chains. The oxygen dissolved in a given polymeric substance can play the role of a chain terminator in a free-radical curing reaction, by way of the formation of a peroxy radical, as shown in the scheme below. Oxygen inhibition is particularly pronounced in systems lacking active hydrogen.

R· $\xrightarrow{O_2}$ R—O—O· $\xrightarrow{\text{Slow reaction}}$

Growing polymer radical    Peroxy radical

Active hydrogen containing compounds are able to counteract the peroxy radical which leads to further reaction. Oxygen inhibition can be circumvented using various techniques. Some active systems to counteract oxygen inhibition include the presence of hindered/secondary amines (~NH) and allylic (C=C—CH$_2$—) moieties. Methacrylates contain such allylic hydrogen moieties and are less susceptible than acrylates to oxygen inhibition.

R—O—O· $\xrightarrow{\text{H abstraction}}$ R—O· + HO· $\xrightarrow{\text{Further reaction}}$ Another strategy for counteracting oxygen inhibition is by the inclusion of compounds having multiple active hydrogens. This can particularly be improved by increasing the functionality from di- to tri- and tetra-functionality. Tetrafunctional alcohols provide monomers with six and eight functionalities.

Catalyst:

The compositions of the present invention can be fine-tuned to include the appropriate concentration of these monomers along with systems with active hydrogen as well as photo and/or heat active peroxides. Iron, and more generally, catalytic transition metals result in the formation of hydroxyl radicals (HO.) superoxide generating systems. Those of ordinary skill in the art understand that superoxide can reduce ADP—Fe(III) to ADP—Fe(II) and, this iron facilitates the apparent production of (HO.). Chelating agents (in the proper proportions) can also alter the reactivity of iron in superoxide-generating systems. It has been shown that EDTA3 enhances the reactivity of iron toward $O_2$·— while DETAPAC4 drastically slows the $O_2$·— reaction with iron. The use of catalysts and chelating agents is beneficial to optimizing the desirable free radical generation that leads to the desirable reactions.

In a further preferred embodiment, catalysts can be added for increasing free radical formation. Suitable catalysts include, but are not limited to, manganese naphthenate, cobalt naphthenate, and vanadium pentoxide quaternary ammonium salt can be used.

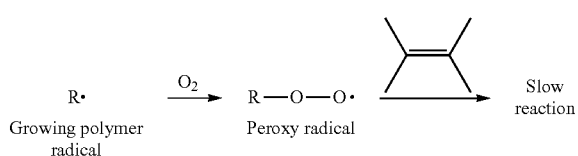

cobalt naphthenate
R = H and or alkyl

In the case where there is a combination of a UV and a heat activated peroxide, an initial UV activation can subsequently engender an exothermic reaction which in turn engender the activation of a thermal peroxide. Another simple method of minimizing oxygen inhibition is to carry out the reaction using an inert atmosphere. The flow of nitrogen and argon on the surface of the materials can be used to limit the oxygen exposure and minimize oxygen induced cure inhibition.

Resins:

The fundamental advantages of the present invention are widely applicable to a variety of resins. The examples provided here are illustrative of examples rather than inclusive of the possibilities.

In the present invention, the term polymer includes both homopolymers and copolymers, which collectively can be referred to as (co)polymers. Polymers are molecules with many repetitive units (monomers). The units can be the same (identical) in which case this would be a homopolymer. On the other hand the polymer be made of dissimilar units (monomers) in which case the polymer would be a copolymer. Covalent bonding is prevalent but there are cases where ionic bonds and hydrogen bonding is present, depending on the particular monomers present. Examples of monomeric species include, but are not limited to, acrylates, methacrylates, olefins (such as ethylene, propylene, butylene and mixtures thereof), ethers, styrenes, fluoroolefins (such as fluoroethylenes, tetrafluoroethylenes, etc), esters, carbonates, urethanes, vinyl chlorides, vinyl chloride acetates, amides, imides, acetals, methylpentenes, sulfones, acrylics, styrene acrylics, acrylonitrile, etc. Examples of a co-polymer would include, for example, a polymer made from two or more of these species. Furthermore, the definition extends to more than two monomeric species including terpolymers, and a variety of side groups of different structures than the blended monomeric species. The term polymer is inclusive of any of these variations. Within the present invention, when the present invention composition contains a polymer, it is important that the polymer be able to generate a free radical species by any free radical generation mechanism available to the polymer, including, but not limited to, hydrogen, atom or group abstraction, chain scission, radical addition to unsaturation points in the polymer, etc.

Activation with X-Ray:

In a preferred embodiment of the present invention, it is desired to initiate a chemical reaction using a deeply penetrating and ionizing form of energy such as X-Ray or e-beam (the initiation energy). The term "X-Ray susceptible polymer" refers to a polymer chemistry that undergoes free radical formation, such as by atom/group abstraction, chain scission, or other mechanism, under X-Ray; and, as a result will have various characteristics (at least one) changing post exposure to the initiation energy. The molecular weight of the polymer can be reduced or a side group can be cleaved. Either one of these characteristics is desirable in the present invention. Extended exposure to the initiation energy could result in degradation and therefore there is a low threshold of energy (Lower dose for initiation) required to initiate the reaction and an upper energy dose which represents a damage threshold (upper dose control limit).

In one embodiment of the present invention, an example of a "X-Ray susceptible polymer" can include, but is not limited to, aliphatic polymers. Aliphatic polymers can include alicyclic (no-aromatic rings), alkanes (single bonds), alkenes (unsaturated with double bonds), alkynes (triple bonds) of carbon and hydrogen atoms. One example of an aliphatic polymer would be polyethylene, or a polyethylene-polypropylene copolymer.

Peroxides are widely used commercially to initiate and create free-radical initiation. The reactive free radical species generated then reacts with its environment to form chemical bonds. Such methods are used, for example, to graft maleic anhydride to polyolefins. In general chain scission can outpace competing reactions. For example, in the particular case of propylene, chain scission and grafting are competitive reactions. However, chain scission outpaces grafting which curbs the achievable molecular weight of the grafted resin.

Maleic anhydride

Suitable polyolefins include, but are not limited to polyethylene (PE), polypropylene (PP) and ethyl vinyl acetate (EVA). Polyethylene is conventionally classified according to its density as Very Low Density Polyethylene (VLDPE), Low Density Polyethylene (LDPE), Linear Low Density Polyethylene (LLDPE), Medium Density Polyethylene (MDPE), and High Density Polyethylene (HDPE).

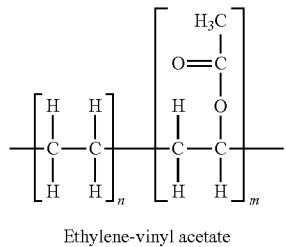

Ethylene-vinyl acetate

Examples of propylene polymers include propylene homopolymers and copolymers of propylene with ethylene or another unsaturated co-monomer. Copolymers also include terpolymers, tetrapolymers, etc. Typically, the units originating from propylene monomer comprise at least about 70 weight percent of the copolymer.

The mechanical and chemical properties of these resins can be tailored to become suitable for the desired application. The resin type, the catalyst, molecular weight, molecular weight distribution (MWD), crystallinity, branching and density all play a role in the microstructure and the behavior of the resin and its performance in the end use application. The choice of these characteristics depending on end use is well within the skill of one of ordinary skill in the art.

As a free radical inducing species for use in the present composition, suitable compounds include, but are not limited to, organic peroxides, azo free-radical initiators, and bicumene. Preferably, the free-radical inducing species is an organic peroxide. The organic peroxide can be added via direct injection or via blending with the chemistry of the polymer. The addition of the organic peroxide is in an amount sufficient to provide a concentration of free radicals sufficient for initiating reaction at enough sites to effect bonding, preferably from about 0.005 weight percent to about 20 weight percent, more preferably from about 0.25 weight percent to about 10 weight percent, most preferably from about 0.5 weight percent to about 5 weight percent.

In a similar fashion to the technical strategies employed to prohibit oxygen inhibition, the present invention methods can optionally employ one or more co-grafting reagents in order to minimize (or curb) chain scission. For this reason reagents containing two or more terminal carbon-carbon double bonds or triple bonds can be combined with free-radical generation to mitigate the loss in melt viscosity of polypropylene by coupling of polymer chains.

Optional Additives:

The present invention compositions can optionally further contain various conventional components that are suitable for the desired application. These can include, but are not limited to, the following agents: fillers, clays, fire retardant, scorch inhibitors, and blowing agents such as azodicarbonamide.

Activation with X-Ray and UV:

A preferred method of generating free-radicals in the present invention include the use of X-rays, electron-beam and gamma radiation. The present invention can use either X-ray or e-beam both as a source of free radical generation instead of, or in addition to UV light. UV generation is performed via the use of energy modulation agents, preferably in the form of particles, that absorb X-ray and convert it to UV. These particles are disposed at the interface where bonding is targeted to take place. The UV light (regardless of its generation) can in turn engender additional free radical generation.

Functional Energy Modulation Agents:

In one aspect of the invention, an energy modulation agent is added to the chemistry where the energy modulation agent is combined with an organic peroxide and an organic vehicle. Examples of the energy modulation agent include, but are not limited to: $BaFCl:Eu^{2+}$, $BaSO_4^-:Eu^{2+}$, $LaOBr:Tm^{3+}$, $YTaO_4$, $YTaO_4:Nb$ (*), $CaWO_4$, $LaOBr:Tb^{3+}$, $Y_2O_2S:Tb^{3+}$, $ZnS:Ag$, $(Zn,Cd)S:Ag$, $Gd_2O_2S:Tb^{3+}$, $La_2O_2S:Tb^{3+}$. A more comprehensive list is provided in the following table.

The present inventors have also used visible phosphors that have the capability to generate radical oxygen species under X-Ray. The emission under X-Ray is shown in FIG. 1.

| Phosphor Color | Emission Spectrum Peak Emission (nm) | Emiss Eff (%) | Eff (z) | X-Ray Absorption K-edge (keV) | Specific Gravity | Crystal Structure | Hygroscopic |
|---|---|---|---|---|---|---|---|
| $Zn_3(PO_4)_2:Tl+$ | 310 | | | | | | N |
| $BaF_2$ | 310 | | | | | | Slightly |

| Phosphor Color | Emission Spectrum Peak Emission (nm) | Emiss Eff (%) | Eff (z) | X-Ray Absorption K-edge (keV) | Specific Gravity | Crystal Structure | Hygroscopic |
|---|---|---|---|---|---|---|---|
| CsI | 315 | | | | | | N |
| Ca3(PO4)2:Tl+ | 330 | | | | | | N |
| YTaO4 | 337 | | 59.8 | 67.42 | 7.5 | Monolithic | N |
| CsI:Na | 338 | | | | | | Y |
| BaSi2O5:Pb2+ | 350 | | | | | | N |
| Borosilicate | 350 | | | | | | N |
| LaCl3(Ce) | 350 | | | | | | Y |
| SrB4O7F:Eu2+ | 360 | | | | | | N |
| RbBr:Tl+ | 360 | | | | | | ? |
| (Ba,Sr,Mg,)3Si2O7:Pb2+ | 370 | | | | | | N |
| YAlO3:Ce3+ | 370 | | | | | | N |
| BC-422 | 370 | | | | | Organic | ? |
| BaFCl:Eu2+ | 380 | 13 | 49.3 | 37.38 | 4.7 | Tetragonal | N |
| BaSO4–:Eu2+ | 390 | 6 | 45.5 | 37.38 | 4.5 | Rhombic | N |
| BaFBr:Eu2+ | 390 | | | | | | ? |
| BC-420 | 391 | | | | | Organic | ? |
| BC-414 | 392 | | | | | Organic | ? |
| SrMgP2O7:Eu2+ | 394 | | | | | | N |
| BaBr2:Eu2+ | 400 | | | | | | N |
| (Sr,Ba)Al2Si2O8:Eu2+ | 400 | | | | | | N |
| YTaO4:Nb(*) | 410 | 11 | 59.8 | 67.42 | 7.5 | Monolithic | N |
| Y2SiO5:Ce3+ | 410 | | | | | | N |
| CaWO4 | 420 | 5 | 61.8 | 69.48 | 6.1 | Tetragonal | N |
| LaOBr:Tb3+ | 420 | 20 | 49.3 | 38.92 | 6.3 | Tetragonal | N |
| Y2O2S:Tb3+ | 420 | 18 | 34.9 | 17.04 | 4.9 | Hexgonal | N |
| Lu2SiO5:Ce3+ | 420 | | | | | | N |
| Lu1.8 Y0.2SiO5:Ce | 420 | | | | | | N |
| ZnS:Ag | 450 | 17 | 26.7 | 9.66 | 3.9 | Hexgonal | N |
| CdWO4 | 475 | | | | | | Slightly |
| Bi4Ge3O12 (BGO) | 480 | | | | | | N |
| (Zn,Cd)S:Ag | 530 | 19 | 38.4 | 9.66/26.7 | 4.8 | Hexgonal | N |
| Gd2O2S:Tb3+ | 545 | 13 | 59.5 | 50.22 | 7.3 | Hexgonal | N |
| La2O2S:Tb3+ | 545 | 12.5 | 52.6 | 38.92 | 6.5 | Hexgonal | N |
| Y3Al5O12 (Ce) | 550 | | | | | | N |
| LaOBr:Tm3+ | 360, 460 | 14 | 49.3 | 38.92 | 6.3 | Tetragonal | N |
| CaF2(Eu) | 435/300 | | | | | | N |

Figure 2:
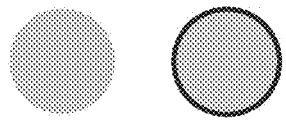
FIG. 2 is a graphical representation of phosphors with or without a coating, and when a ball mill is used, individually coated powders.
Figure 2:
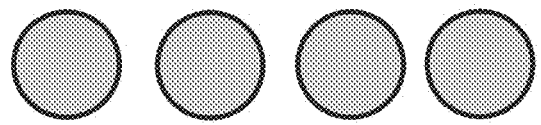

The various energy modulation agent (such as phosphor) particles can be preferably coated using poly(methyl)methacrylate (PMMA). The process was performed by first dissolving PMMA into acetone and then rolling the phosphors with the solution in a ball mill using 5 mm zirconia as the grinding and mixing balls. The solution is then recovered and then dried. Upon acetone evaporation the particles were left with a surface coating of PMMA. Alternatively, the energy modulation agent can be incorporated directly into a polymer contained in the reactive chemistry of the present invention (either in the surface of the substrate, or in a coating applied to the substrate, or in an intermediary layer) by using the phosphor as a particulate filler, which is blended into the composition using any conventional mixing method. The energy modulation agent/phosphor be used with or without a coating, and when a ball mill is used, a number of powders can be individually coated (see FIG. 2).

The thickness of the coating can be estimated from the following calculations:

| PMMA Coating | |
|---|---|
| target thickness (nano meters) | 50 |
| Phosphor Density (g/cc) | 7.5 |
| Calculations | |
| Particle Size (m) | 1.00E−06 |
| Density (g/m$^3$) | 7.50E+06 |
| Volume (m$^3$) | 5.23E−19 |
| Surface Area (m$^2$) | 7.85E−13 |
| Weight per particle (g) | 3.93E−12 |
| Number of particles per gram | 2.55E+11 |
| Desirable Coating Thickness (m) | 5E−08 |
| Volume of the coating per gram | 1.00E−08 |
| Density of PMMA (g/cc) | 1.4 |
| Density of PMMA (g/m3) | 1.40E+06 |
| Weight of PMMA preferred per gram of phosphor | 1.40E−02 |
| Slurry Composition (per gram of phosphor) | |
| Phosphor (g) | 1 |
| PMMA (g) | 1.40E−02 |
| Acetone (cc) | 12.5 |
| Zirconia (g) | 125 |
| Jar Volume (cc) | 50 |

Furthermore, the PMMA coating can include some of the desirable organic peroxide chemistries. These chemistries can be added in liquid form and can be rolled in a jar in the ball mill in acetone. Upon drying the solvent, the PMMA coating is doped with the organic peroxide chemistry. As an example, dicumyl peroxide can be added at 1% by weight in the previous table.

Figure 3:
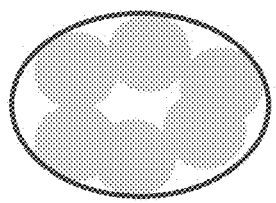
FIG. 3 is a graphical representation of an aggregate of the phosphors coated with PMMA resin.

If the particles are not completely dispersed then an aggregate of the phosphors can be coated with the PMMA resin (See FIG. 3).

Figure 4:
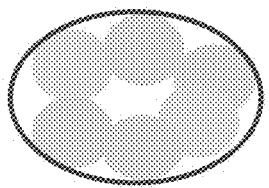
FIG. 4 is a graphical representation of an aggregate of a plurality of different phosphors coated using PMMA, which may optionally contain a peroxide chemistry.
Figure 4:
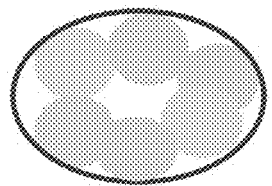

Furthermore, if a combination of different phosphors are used then a aggregate of the plurality of different phosphors can be coated using PMMA, which may optionally contain a peroxide chemistry (see FIG. 4). The molecular weight of the PMMA can vary as needed to form a coating.

Figure 5:
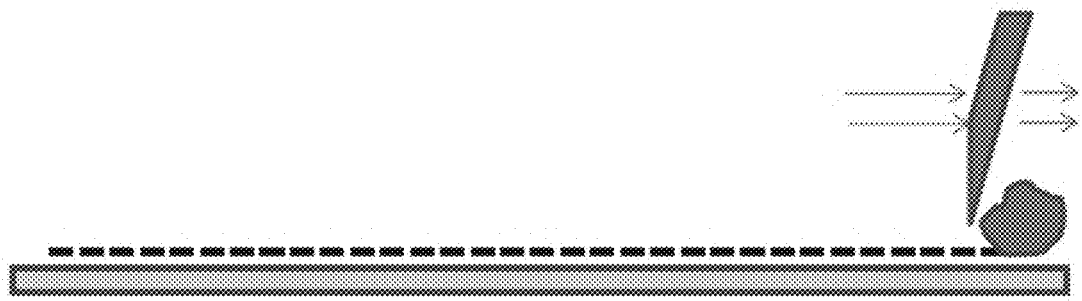
FIG. 5 is a graphical representation of forming a film by taking slurry and using a drawing knife.
Figure 6:
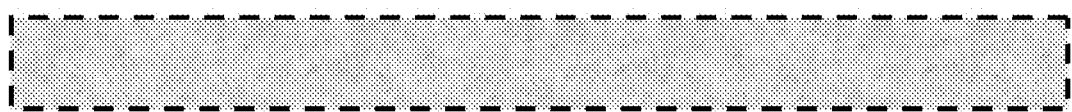
FIG. 6 is a graphical representation of using a die cutter to punch a cut out from a phosphor loaded conformable film.
Figure 6:
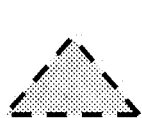
Figure 6:
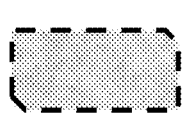
Figure 6:
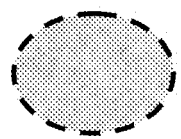
Figure 7:
FIG. 7 is a graphical representation of how a conformable film that is phosphor loaded can accommodate stretching and maintaining its shape across complex interfaces.

By adding the weight percent in the mix to high enough levels, such as above 0.03 g per 1 g of phosphors, the coating no longer forms a discontinuous phase where individual particles are coated; but, rather, the particles start to neck and to connect laterally which culminates in the formation of a film. At a ratio of 5 weight percent of higher, the necking of particles enables the formation of a film. The film can be preferably obtained by taking the slurry and using a drawing knife (FIG. 5). The conformable film can be drawn using a 1 mil to 8 mil knife. A die cutter can punch a cut out from the phosphor loaded conformable film as shown in FIG. 6. Various geometries can be formed in this manner. The conformable film that is phosphor loaded can accommodate stretching and maintaining its shape across complex interfaces (see FIG. 7).

Furthermore, the preparation of the film can be done using plasticizers in the mix prior to casting. About 2% to 5% by weight is a preferable range of such plasticizers. Plasticizers with boiling point temperatures above room temperature remain embedded in the film and make the film's surface sticky. This is desirable in case the film is to be used between two substrates to be adhered. Examples of suitable plasticizers include, but are not limited to, tripropylene glycol. The addition of a small amount of tripropylene glycol in the film (around 2% by weight of solids) and the placement of the film at the interface of two substrates allows a good material transport between the substrates and promotes bonding. Excessive tripropylene glycol would prohibit adhesion.

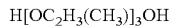

Tripropylene Glycol

Obviously, numerous modifications and variations of the present invention are possible in light of the above teachings. It is therefore to be understood that within the scope of the appended claims, the invention may be practiced otherwise than as specifically described herein.

The invention claimed is:

1. A system for bonding materials having different coefficients of thermal expansion, comprising:
a first substrate having at least one surface containing a first reactive polymer composition;
a second substrate, optionally having at least one surface containing a second reactive polymer composition;
wherein the first substrate and the second substrate are different from one another and have different coefficients of thermal expansion from one another, wherein the first reactive polymer composition and the second reactive polymer composition may be the same or different, and each comprises a (co)polymer that forms one or more reactive moieties selected from the group consisting of free-radicals, cations, anions, carbenes, and nitrenes, either directly or indirectly, upon application of an ionizing radiation and a multifunctional curing coagent to reduce oxygen inhibition, minimize or curb chain scission, or both, wherein the multifunctional curing coagent is a di-, tri-, or tetra-functional alcohol compound; and
a source of ionizing radiation.

2. The system of claim 1, wherein the one or more reactive moieties are one or more free-radicals.

3. The system of claim 1, wherein the alcohol compound is a tetra-functional alcohol.

4. The system of claim 1, wherein the first reactive polymer composition comprises a (co)polymer formed from one or more monomers selected from the group consisting of acrylates, methacrylates, olefins, ethers, styrenes, fluoroolefins, esters, carbonates, urethanes, vinyl chlorides, vinyl chloride acetates, amides, imides, acetals, methylpentenes, sulfones, acrylics, styrene acrylics, and acrylonitriles.

5. A method for bonding materials having different coefficients of thermal expansion, comprising:
providing a first substrate and a second substrate to be bonded together, wherein the first and second substrates are different from one another and have different coefficients of thermal expansion from one another;
providing a first reactive polymer composition comprising a (co)polymer that forms one or more reactive moieties selected from the group consisting of free-radicals, cations, anions, carbenes, and nitrenes, either directly or indirectly, upon application of an ionizing radiation and a multifunctional curing coagent to reduce oxygen inhibition, minimize or curb chain scission, or both, wherein the multifunctional curing coagent is a di-, tri-, or tetra-functional alcohol compound, wherein the first reactive polymer composition is in contact with at least one of the first and second substrates;
placing the first and second substrates in close proximity to one another; and
applying the ionizing radiation, thus forming the one or more reactive moieties in the first reactive polymer composition which react to form a bond between the first and second substrates.

6. The method of claim 5, wherein the one or more reactive moieties are one or more free-radicals.

7. The method of claim 5, wherein the alcohol compound is a tetra-functional alcohol.

8. The method of claim 5, wherein the first reactive polymer composition comprises a (co)polymer formed from one or more monomers selected from the group consisting of acrylates, methacrylates, olefins, ethers, styrenes, fluoroolefins, esters, carbonates, urethanes, vinyl chlorides, vinyl chloride acetates, amides, imides, acetals, methylpentenes, sulfones, acrylics, styrene acrylics, and acrylonitriles.

9. A method for bonding materials having different coefficients of thermal expansion, comprising:
providing a first substrate and a second substrate to be bonded together, wherein the first and second substrates are different from one another and have different coefficients of thermal expansion from one another;
providing a first reactive polymer composition comprising a (co)polymer that forms one or more reactive moieties selected from the group consisting of free-radicals, cations, anions, carbenes, and nitrenes, either directly or indirectly, upon application of an ionizing radiation and a multifunctional curing coagent to reduce oxygen inhibition, minimize or curb chain scission, or both, wherein the multifunctional curing coagent is a di-, tri-, or tetra-functional alcohol compound;
placing the first and second substrates in close proximity to one another and having the first reactive polymer composition therebetween; and
applying the ionizing radiation, thus forming the one or more reactive moieties in the first reactive polymer composition which react to form a bond between the first and second substrates.

10. The method of claim 9, wherein the one or more reactive moieties are one or more free-radicals.

11. The method of claim 9, wherein the alcohol compound is a tetra-functional alcohol.

12. The method of claim 9, wherein the first reactive polymer composition comprises a (co)polymer formed from one or more monomers selected from the group consisting of acrylates, methacrylates, olefins, ethers, styrenes, fluoroolefins, esters, carbonates, urethanes, vinyl chlorides, vinyl chloride acetates, amides, imides, acetals, methylpentenes, sulfones, acrylics, styrene acrylics, and acrylonitriles.

* * * * *

UNITED STATES PATENT AND TRADEMARK OFFICE
CERTIFICATE OF CORRECTION

PATENT NO. : 10,974,493 B2
APPLICATION NO. : 15/896654
DATED : April 13, 2021
INVENTOR(S) : Fathi Page 1 of 1

It is certified that error appears in the above-identified patent and that said Letters Patent is hereby corrected as shown below:

On the Title Page

Column 1, under "Related U.S. Application Data", delete "(60)" and insert -- (63) --, therefor.

Column 2, Item (57), under "ABSTRACT", Line 2, delete "moities," and insert -- moieties, --, therefor.

In the Specification

In Column 2, Line 65, delete "wherein:3" and insert -- wherein: --, therefor.

In Column 12, Line 66, delete "a" and insert -- an --, therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*